United States Patent
Petrasek et al.

[15] 3,653,882
[45] Apr. 4, 1972

[54] METHOD OF MAKING FIBER COMPOSITES

[72] Inventors: Donald W. Petrasek, Rocky River; Robert A. Signorelli, Strongsville; John W. Weeton, Rocky River; Gerald B. Beremand, Avon, all of Ohio

[73] Assignee: The United States of America as represented by the Administrator of the National Aeronautics and Space Administration

[22] Filed: Feb. 27, 1970

[21] Appl. No.: 15,222

Related U.S. Application Data

[62] Division of Ser. No. 768,907, Oct. 18, 1968.

[52] U.S. Cl. .................................75/208, 75/211, 75/226, 75/DIG. 1
[51] Int. Cl. .........................................................B22f 3/14
[58] Field of Search ........................75/200 F, 208, 211, 226

[56] References Cited

UNITED STATES PATENTS

| 3,351,439 | 11/1967 | Jost | 29/182.2 |
| 3,233,985 | 2/1966 | Kraft et al. | 29/191.2 |
| 3,098,723 | 7/1963 | Micks | 29/183.5 |
| 2,455,804 | 12/1948 | Ransley et al. | 29/191.2 |
| 3,291,577 | 12/1966 | Davies et al. | 29/182.2 |
| 3,337,337 | 8/1967 | Weeton et al. | 75/204 |

FOREIGN PATENTS OR APPLICATIONS

| 706,486 | 3/1954 | Great Britain | 75/208 |

Primary Examiner—Benjamin R. Padgett
Assistant Examiner—B. H. Hunt
Attorney—N. T. Musial, G. E. Shook and G. T. McCoy

[57] ABSTRACT

A method of making a fiber composite having high strength at 2000° to 2200° F. by slip casting a nickel alloy matrix slurry into an array of tungsten fibers. The slip is dried and sintered in dry hydrogen at 1500° F. for one hour. The resulting body is isostatically hot pressed at 20,000 p.s.i. and 1500° F. for one hour, followed by a second isostalic hot pressing at 2000° F. for 1 hour.

8 Claims, No Drawings

METHOD OF MAKING FIBER COMPOSITES

RELATED APPLICATION

This application is a division of copending application Ser. No. 768,907 which was filed Oct. 18, 1968.

STATEMENT OF GOVERNMENT OWNERSHIP

The invention described herein was made by employees of the United States Government and may be manufactured and used by or for the Government of the United States of America for governmental purposes without the payment of any royalties thereon or therefor.

BACKGROUND OF THE INVENTION

Advanced airbreathing engines need high strength materials for use at temperatures above 1800° F. The tensile and stress-rupture strengths of nickel- and cobalt-base superalloys are less than those required by such engines at the high temperatures. Alloys of the refractory metals tungsten, molybdenum, columbium, and tantalum have the required strength, but they are more prone to catastrophic oxidation. Ceramic or refractory compounds are subject to brittle failure.

Metal fiber-reinforced superalloy composites have been proposed for use at high temperatures. Reactions between the fibers and the matrix are often detrimental to the properties of the composite. The tensile and stress-rupture property values of such materials exhibit little improvement over the unreinforced superalloy materials.

Dry powder fabrication processes were also tested while the diffusion bonding of alternate layers of metal foil and fibers was likewise considered. These procedures limit fiber content to about 50 volume percent. Liquid phase methods have been utilized to achieve higher fiber contents. However, the liquid phase matrix materials can cause severe fiber degradation.

SUMMARY OF THE INVENTION

A high strength fiber composite material is prepared by slip casting a matrix powder-water slurry into an array of fibers. The preferred matrix composition in weight percent is nickel 56, tungsten 25, chromium 15, titanium 2, and aluminum 2. The preferred fiber composition is tungsten with one weight percent thorium oxide. The slip casting is dried and then consolidated by pressing and heating. Fiber contents are varied to achieve the desired reinforcement.

OBJECTS OF THE INVENTION

It is, therefore, an object of the present invention to provide an improved method of making high strength fiber composite material for use at elevated temperatures where weight savings are desirable.

Another object of the invention is to provide a method of making a fiber composite suitable for use where higher strength or greater strength to density ratios are required than those exhibited by the superalloys.

A further object of the invention is to provide a method of making a refractory metal fiber reinforced superalloy material composite having superior strength to density properties wherein the loss of fiber properties within the matrix is limited.

These and other objects of the invention will be apparent from the specification that follows.

DESCRIPTION OF THE PREFERRED EMBODIMENT

According to the invention fiber reinforced composites are prepared by slip casting a superalloy matrix into a bundle of fibers. Composites were prepared in this manner using bundles of NF and 218CS wire. The composition of the NF wire was tungsten with 1 percent thoria. The 218CS wire was commercial tungsten.

The wire was received in the as-drawn, cleaned, and straightened condition. Wires having diameters of 0.008, 0.015, and 0.020 inch were used.

The superalloy matrix compositions were selected to be compatible with the wire material while taking into consideration forgeability and oxidation resistance at high temperatures. A large amount of refractory metal was added to a nickel matrix to lower the reactivity with the reinforcing fibers by reducing the chemical potential differential for diffusion. A high percentage of chromium was also added to the nickel to enhance oxidation resistance. The nominal compositions of the matrix in weight percent was nickel 56, tungsten 25, chromium 15, titanium 2, and aluminum 2.

Aluminum additions were made to the alloy to form a gamma prime phase ($Ni_3Al$), and titanium additions were made to these alloys to form an eta phase ($Ni_3Ti$). Both of these elements precipitation hardened the nickel alloy. The additions to the alloy were substituted for corresponding amounts of chromium. These additions tie up three atoms of nickel for each atom added and further lower the reactivity of the matrix alloy with the fiber by lowering the nickel potential for diffusion.

The nickel alloy was vacuum cast and atomized into fine powder. The particle size of the metal powder was −325 to +500 mesh. A 2.5 percent solution of a binder material comprising an ammonium salt of alginic acid in water was added to the metal powder to form a slip. The solution was then diluted with water so that the solid to liquid ratio was reduced and the viscosity was lowered to the point where the slip was pourable.

The metal powder content of the slip was 89.9 percent by weight while the water content was 10.0 percent by weight. The binder content was 0.1 percent by weight.

Continuous length refractory wire bundles were inserted into a nickel tube containing a wire screen at the bottom adjacent several layers of filter paper. The tube containing the wire bundles was connected to a vacuum pump through a hose.

The nickel tube was placed on a vibrating table, and slip was poured into the wire bundle while the tube was vibrated. As the nickel-alloy powder settled to the bottom of the bundle excess liquid media was siphoned off the top and more slip was added. This process was continued until the nickel-alloy powder completely infiltrated to the top of the wire bundle.

The vibrator was stopped, and a vacuum was applied to the tube to remove any additional liquid media left in the casting. The composite was removed from the tube and dried in air for approximately 24 hours at 140° F.

The densification technique used on the composites consisted of sintering the slip cast composite at 1500° F. for one hour in dry hydrogen to drive off the binder and to reduce any nickel or chromium oxide film that might be present on the surface of the powders. After sintering, the composites were sealed in nickel cans. Final densification was accomplished by isostatically hot pressing the billets first at 1500° F. for 1 hour and then at 2000° F for 1 hour under helium pressurized at 20,000 p.s.i.

Stress-rupture tests on single fibers were conducted in a stress-rupture apparatus at 2000° and 2200° F. for periods up to 200 hours. Stress-rupture tests on vacuum-cast nickel-alloy specimens and on composite test specimens were conducted in conventional creep machines using a helium atmosphere to limit oxidation. These tests were likewise conducted at 2000° and 2200° F. Tensile tests were conducted on the fibers and composites at 2000° F.

The stress to cause rupture at 100 hours at 2000° and 2200° F. for the wire material and the nickel alloys is shown in Table 1. Also shown in this Table is the stress to cause rupture at 100 hours divided by the material density (specific strength).

TABLE I.—STRESS-RUPTURE IN 100 HOURS

| Wire Mat'l. | Dia./in. | Test temp., °F. | Stress, p.s.i. | Stress to density ratio, in. |
|---|---|---|---|---|
| NF | 0.008 | 2,000 | 76,000 | 110,000 |
| NF | .020 |  | 80,000 | 116,000 |
| 218CS | .008 |  | 64,000 | 92,000 |
| 218CS | .015 |  | 55,000 | 79,000 |
| 218CS | .020 |  | 50,000 | 72,000 |
| NF | 0.008 | 2,200 | 54,000 | 77,000 |
| NF | .020 |  | 50,000 | 72,000 |
| 218CS | .008 |  | 46,000 | 66,000 |
| 218CS | .015 |  | 40,000 | 58,000 |
| 218CS | .020 |  | 35,000 | 51,000 |
| Nickel Alloy |  | 2,000 | 3,300 | 10,000 |
|  |  | 2,200 | 1,000 | 3,000 |

Composites were produced using the wires and nickel alloy matrix shown in Table 1. These composites had stress-rupture properties superior to conventional superalloys at use temperatures of 2000° and 2200° F. Composite stress-rupture properties are shown in Table II.

The 100-hour stress-rupture strength obtainable for composites containing 70 volume percent of either 0.015 inch diameter 218CS wire or 0.020 inch diameter NF wire at 2000° F. was 35,000 p.s.i. as compared with 11,500 p.s.i. for the best cast nickel alloys. At 2,200° F. the 100-hour stress-rupture strength obtainable for the 70 volume percent fiber composite was 14,000 p.s.i. as compared with 4,000 p.s.i. for the cast nickel alloys. The 100-hour rupture strength for the composite at 2,000° F. represents a use temperature advantage over cast nickel alloys of approximately 200° F.

TABLE II.—COMPOSITE STRESS-RUPTURE PROPERTIES

| Wire Mat'l. | Dia./in. | Stress, p.s.i. | Life, hr. | Fiber content, vol. percent | Test temp., °F |
|---|---|---|---|---|---|
| 218CS | 0.008 | 20,000 | 41.1 | 40.8 | 2,000 |
|  |  | 20,000 | 81.3 | 44.7 | 2,000 |
|  |  | 20,000 | 91.7 | 45.2 | 2,000 |
|  |  | 25,000 | 15.3 | 37.7 | 2,000 |
|  |  | 25,000 | 61.0 | 59.0 | 2,000 |
|  |  | 25,000 | 86.4 | 48.1 | 2,000 |
| 218CS | 0.015 | 25,000 | 8.5 | 44.8 | 2,000 |
|  |  | 25,000 | 155.7 | 53.7 | 2,000 |
|  |  | 25,000 | 245.4 | 39.6 | 2,000 |
|  |  | 30,000 | 95.2 | 62.0 | 2,000 |
|  |  | 35,000 | 1.7 | 48.2 | 2,000 |
|  |  | 35,000 | 4.4 | 49.1 | 2,000 |
|  |  | 35,000 | 5.5 | 50.0 | 2,000 |
|  |  | 35,000 | 33.4 | 62.7 | 2,000 |
|  |  | 10,000 | 19.2 | 41.3 | 2,200 |
|  |  | 10,000 | 36.5 | 50.3 | 2,200 |
|  |  | 10,000 | 38.6 | 51.7 | 2,200 |
|  |  | 15,000 | 7.8 | 43.5 | 2,200 |
|  |  | 15,000 | 18.7 | 55.8 | 2,200 |
| NF | 0.020 | 25,000 | 84.2 | 52.8 | 2,000 |
|  |  | 25,000 | 141.4 | 59.7 | 2,000 |
|  |  | 25,000 | 251.6 | 61.5 | 2,000 |
|  |  | 30,000 | 79.3 | 59.7 | 2,000 |
|  |  | 30,000 | 127.2 | 61.2 | 2,000 |
|  |  | 30,000 | 207.2 | 62.8 | 2,000 |
|  |  | 30,000 | 264.8 | 70.3 | 2,000 |
|  |  | 35,000 | 36.0 | 65.0 | 2,000 |
|  |  | 10,000 | 43.8 | 60.3 | 2,200 |
|  |  | 10,000 | 47.5 | 60.6 | 2,200 |
|  |  | 10,000 | 17.1 | 63.4 | 2,200 |
|  |  | 15,000 | 46.5 | 55.3 | 2,200 |
|  |  | 15,000 | 57.9 | 66.6 | 2,200 |
|  |  | 15,000 | 60.6 | 59.7 | 2,200 |

The density of the composite material is much greater than that of the nickel alloy. The density of the material is important for certain applications, such as in turbine blades where tensile stresses are a result of centrifugal loading. Tungsten has a density about 2.3 times that of most nickel-base alloys, and a composite containing 70 volume percent tungsten fibers has a density of approximately 1.9 times that of nickel base alloys. The temperature advantage of the composite is somewhat reduced on a specific strength basis. However, on this basis the 70 volume percent reinforced composite is more than 5 times as strong for a 100-hour rupture life at 2000° F. than for the unreinforced nickel matrix alloy. Also, the 70 volume percent fiber reinforced composite is approximately 60 percent better than the best case nickel alloys for rupture in 100 hours and 3 times as strong for rupture in 1,000 hours. The 70 volume percent fiber reinforced composite is 2 times as strong at 2,200° F. as the cast nickel alloys for 100-hour rupture life and 2.5 times as strong for an expected 1,000-hour rupture life.

Tensile strength at 2,000° F. of composites made in accordance with the invention are shown in Table III. Both 218CS and NF wires were used with the nickel alloy matrix. The 218CS wire had a diameter of 0.015 and a tensile strength of 111,000 p.s.i. at 2,000° F. The NF wire had a diameter of 0.020 inch and a tensile strength of 116,000 p.s.i. at 2,000° F.

TABLE III.—COMPOSITE TENSILE STRENGTH AT 2,000° F.

| Wire Mat'l. | Tensile Strength, p.s.i. | Fiber content, vol. percent | Elongation, percent |
|---|---|---|---|
| 218CS | 46,500 | 40.3 | 3.17 |
|  | 49,500 | 45.2 |  |
|  | 61,800 | 54.7 | 4.23 |
|  | 78,000 | 60.8 | 4.23 |
|  | 97,000 | 79.5 |  |
| NF | 60,800 | 55.0 |  |
|  | 68,000 | 50.9 | 4.23 |
|  | 71,500 | 52.8 | 4.57 |
|  | 77,000 | 55.3 | 5.39 |
|  | 78,000 | 64.4 |  |
|  | 91,500 | 67.5 | 5.49 |
|  | 76,000 | 54.0 | 4.76 |
|  | 83,200 | 60.3 | 4.85 |
|  | 66,800 | 46.2 | 4.20 |

The nickel alloy matrix containing titanium and aluminum additions was more compatible with the 218CS and NF fibers than nickel alloys which did not contain these additives. The reaction between the mutually soluble fiber and matrix material in the above composites was limited to approximately 1.25 mils after exposure for 100 hours at 2,000° F.

Wire diameter is also important in composites where reactions between the fiber and matrix material occurs. The strength contribution of the reacted fiber in a composite can be related to the area fraction of the fiber that has been alloyed. In composites fabricated in accordance with the present invention the strength contribution of the fiber decreased as the area fraction of the alloyed portion of the fiber increased. As the fiber diameter increased, however, the unalloyed fiber strength generally decreased. The method of the present invention takes into account both factors, and the composite strength as a function of wire size and compatibility of the matrix is predictable.

For short-time applications, small diameter fibers are more advantageous than large diameter fibers. For long-time applications, large diameter fibers are superior.

What is claimed is:

1. A method of making a composite comprising the steps of
   assembling tungsten fibers in a parallel array, each of said fibers having a length substantially equal to that of said composite,
   pouring a slip comprising a nickel alloy matrix powder and water, said nickel alloy matrix powder comprising tungsten, chromium, titanium and aluminum into said fiber array,
   removing water from said slip to form a casting, said casting having a fiber content greater than 50 volume percent,
   sintering the slip casting in dry hydrogen at 1500° F. for 1 hour, and
   canning a sintered slip casting,
   isostatically hot pressing the canned sintered casting at about 1500° F. for about 1 hour, and
   isostatically hot pressing the canned sintered casting at about 2,000° F. for about one hour at about 20,000 p.s.i.

2. A method of making a composite as claimed in claim 1 wherein the tungsten fibers contain about 1 percent thoria by weight.

3. A method of making a composite as claimed in claim 1 wherein the fibers have diameters between 0.008 inch and 0.020 inch.

4. A method of making a composite as claimed in claim 1 including the step of slip casting nickel alloy powder into the fiber array, said alloy powder having a nominal composition by weight of tungsten 25 percent, chromium 15 percent, titanium 2 percent, aluminum 2 percent, and the rest substantially nickel.

5. A method of making a composite as claimed in claim 1 wherein the nickel alloy powder comprises about 90 percent of the slip.

6. A method of making a composite as claimed in claim 1 wherein the nickel alloy powder has a particle size between −325 to +500 mesh.

7. A method of making a composite as claimed in claim 1 wherein the slip contains a 2.5 percent solution comprising an ammonium salt of alginic acid in water.

8. A method of making a composite as claimed in claim 1 including the steps of
vacuum drying the slip casting, and
air drying said casting for about 24 hours at about 140° F.

* * * * *